(12) United States Patent
Rajput-Ghoshal et al.

(10) Patent No.: US 9,240,681 B2
(45) Date of Patent: Jan. 19, 2016

(54) SUPERCONDUCTING COIL SYSTEM AND METHODS OF ASSEMBLING THE SAME

(71) Applicant: General Electric Company, Schenectady, NY (US)

(72) Inventors: Renuka Rajput-Ghoshal, Niskayuna, NY (US); James Humphrie Rochford, Troy, NY (US); Probir Kumar Ghoshal, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 87 days.

(21) Appl. No.: 13/727,740

(22) Filed: Dec. 27, 2012

(65) Prior Publication Data

US 2014/0185165 A1    Jul. 3, 2014

(51) Int. Cl.
    *H01F 6/06*     (2006.01)
    *H02H 7/00*     (2006.01)
    *H02H 9/02*     (2006.01)
    *H01F 6/02*     (2006.01)

(52) U.S. Cl.
    CPC .................. *H02H 7/001* (2013.01); *H01F 6/02* (2013.01); *H02H 9/023* (2013.01); *Y02E 40/68* (2013.01); *Y02E 40/69* (2013.01); *Y10T 29/49014* (2015.01)

(58) Field of Classification Search
    USPC ............................................. 361/19; 505/163
    See application file for complete search history.

(56) References Cited

U.S. PATENT DOCUMENTS

| 4,689,707 A | 8/1987 | Schwall |
| 4,763,404 A | 8/1988 | Coffey et al. |
| 4,764,837 A | 8/1988 | Jones |
| 4,777,437 A | 10/1988 | Tashiro et al. |
| 4,812,796 A | 3/1989 | Ries |
| 4,956,337 A | 9/1990 | Ogushi |
| 4,978,922 A | 12/1990 | Mallick, Jr. et al. |
| 4,989,989 A | 2/1991 | Wolfe et al. |
| 4,996,472 A | 2/1991 | Mallick, Jr. |
| 5,067,044 A | 11/1991 | Mallick, Jr. et al. |
| 5,112,801 A | 5/1992 | Nellis et al. |
| 5,179,342 A | 1/1993 | Wolfe et al. |
| 5,216,568 A | 6/1993 | Harada et al. |
| 5,218,505 A | 6/1993 | Kubo et al. |
| 5,225,957 A | 7/1993 | Tsurunaga |

(Continued)

FOREIGN PATENT DOCUMENTS

| EP | 0538072 A2 | 4/1993 |
| EP | 0602647 A1 | 6/1994 |

(Continued)

OTHER PUBLICATIONS

Nozomu., "Quench Protection System Based on an Active Power Method for the Magnetically Coupled Superconducting Coils", The International Conference on Electrical Engineering 2008, Jul. 6-10, 2008, Okinawa, Japan.

*Primary Examiner* — Danny Nguyen
(74) *Attorney, Agent, or Firm* — Francis T. Coppa

(57) ABSTRACT

A superconducting magnet apparatus is provided. The superconducting magnet apparatus includes a power source configured to generate a current; a first switch coupled in parallel to the power source; a second switch coupled in series to the power source; a coil coupled in parallel to the first switch and the second switch; and a passive quench protection device coupled to the coil and configured to by-pass the current around the coil and to decouple the coil from the power source when the coil experiences a quench.

19 Claims, 12 Drawing Sheets

(56) References Cited

U.S. PATENT DOCUMENTS

| | | | |
|---|---|---|---|
| 5,278,380 | A | 1/1994 | Lowry |
| 5,303,111 | A | 4/1994 | Yamaguchi |
| 5,333,087 | A | 7/1994 | Takechi et al. |
| 5,343,180 | A | 8/1994 | Fukumoto et al. |
| 5,361,055 | A | 11/1994 | Peck |
| 5,384,197 | A | 1/1995 | Koyama et al. |
| 5,390,064 | A | 2/1995 | Russo |
| 5,404,122 | A | 4/1995 | Maeda et al. |
| 5,590,536 | A | 1/1997 | Wu |
| 5,594,939 | A | 1/1997 | Curello et al. |
| 5,606,300 | A | 2/1997 | Koyama et al. |
| 5,627,709 | A | 5/1997 | Salasoo |
| 5,644,218 | A | 7/1997 | Emmerich et al. |
| 5,644,233 | A | 7/1997 | Bird et al. |
| 5,650,903 | A | 7/1997 | Gross et al. |
| 5,731,939 | A | 3/1998 | Gross et al. |
| 5,739,997 | A | 4/1998 | Gross |
| 5,812,042 | A | 9/1998 | Maki et al. |
| 5,862,028 | A | 1/1999 | Kalsi |
| 5,999,383 | A | 12/1999 | Hall et al. |
| 6,128,174 | A | 10/2000 | Ritter et al. |
| 6,147,844 | A | 11/2000 | Huang et al. |
| 6,222,434 | B1 | 4/2001 | Nick |
| 6,307,370 | B1 | 10/2001 | Schauwecker et al. |
| 6,316,391 | B1 | 11/2001 | Doi et al. |
| 6,735,848 | B1 | 5/2004 | Markiewicz et al. |
| 6,900,714 | B1 | 5/2005 | Huang et al. |
| 6,977,571 | B1 | 12/2005 | Hollis et al. |
| 7,161,777 | B2 | 1/2007 | Tsuchiya et al. |
| 7,342,757 | B2 | 3/2008 | Huang et al. |
| 7,492,556 | B2 | 2/2009 | Atkins et al. |
| 7,724,483 | B2 | 5/2010 | Bray et al. |
| 7,969,695 | B2 | 6/2011 | Bittner |
| 8,138,867 | B2 | 3/2012 | Tanabe |
| 2002/0014938 | A1 | 2/2002 | Westphal et al. |
| 2002/0101239 | A1 | 8/2002 | Schauwecker et al. |
| 2004/0027737 | A1 | 2/2004 | Xu et al. |
| 2004/0155551 | A1 | 8/2004 | Mawardi |
| 2005/0218731 | A1 | 10/2005 | Ryan et al. |
| 2005/0286180 | A1 | 12/2005 | Huang et al. |
| 2006/0158795 | A1 | 7/2006 | Tsuchiya et al. |
| 2006/0176132 | A1 | 8/2006 | Atkins et al. |
| 2006/0197637 | A1 | 9/2006 | Mallett |
| 2006/0291112 | A1 | 12/2006 | Markiewicz |
| 2007/0063799 | A1 | 3/2007 | Umans |
| 2007/0152787 | A1 | 7/2007 | Spreiter et al. |
| 2007/0217097 | A1 | 9/2007 | Park et al. |
| 2008/0007375 | A1 | 1/2008 | Frantz |
| 2008/0054876 | A1 | 3/2008 | Jang et al. |
| 2008/0076668 | A1 | 3/2008 | Walter et al. |
| 2008/0169889 | A1 | 7/2008 | Gebhardt et al. |
| 2008/0232004 | A1 | 9/2008 | Blakes |
| 2009/0002902 | A1 | 1/2009 | Bittner |
| 2009/0040664 | A1 | 2/2009 | Higuchi et al. |
| 2009/0103217 | A1 | 4/2009 | Langtry et al. |
| 2009/0190274 | A1 | 7/2009 | Ko et al. |
| 2009/0237845 | A1 | 9/2009 | Bray et al. |
| 2010/0045409 | A1 | 2/2010 | Timinger |
| 2010/0056378 | A1 | 3/2010 | Timinger et al. |
| 2010/0109824 | A1 | 5/2010 | Wang |
| 2010/0213772 | A1 | 8/2010 | Zhang et al. |
| 2010/0253373 | A1 | 10/2010 | Kawashima |
| 2010/0254047 | A1 | 10/2010 | Martchevskii |
| 2010/0283565 | A1 | 11/2010 | Blakes |
| 2010/0301977 | A1 | 12/2010 | Tanabe |
| 2011/0057752 | A1* | 3/2011 | Hait et al. ............... 335/216 |
| 2011/0065584 | A1 | 3/2011 | Frantz et al. |
| 2011/0069418 | A1 | 3/2011 | Huang et al. |
| 2011/0082043 | A1* | 4/2011 | Wang et al. ............ 505/162 |
| 2011/0177953 | A1 | 7/2011 | Llambes et al. |
| 2011/0281735 | A1 | 11/2011 | Mumford et al. |
| 2012/0002336 | A1 | 1/2012 | Usoskin et al. |
| 2012/0014030 | A1 | 1/2012 | Ichiki et al. |
| 2012/0021915 | A1 | 1/2012 | Kodama et al. |
| 2012/0071326 | A1 | 3/2012 | Wu et al. |
| 2012/0193924 | A1* | 8/2012 | Okazaki ..................... 290/55 |

FOREIGN PATENT DOCUMENTS

| | | |
|---|---|---|
| EP | 0468415 B1 | 10/1998 |
| EP | 2104198 A2 | 9/2009 |
| EP | 2104198 A3 | 8/2011 |
| GB | 2126028 A | 3/1984 |
| GB | 2456308 A | 9/2009 |
| JP | 57113203 A | 7/1982 |
| JP | 58130769 A | 8/1983 |
| JP | 59041171 A | 3/1984 |
| JP | 2159962 A | 6/1990 |
| JP | 4236106 A | 8/1992 |
| JP | 5090023 A | 4/1993 |
| JP | 6189448 A | 7/1994 |
| JP | 6216804 A | 8/1994 |
| JP | 6347575 A | 12/1994 |
| JP | 7170721 A | 7/1995 |
| JP | 8242574 A | 9/1996 |
| JP | 9084252 A | 3/1997 |
| JP | 2000253645 A | 9/2000 |
| JP | 2010274039 A | 12/2010 |
| JP | 2011138892 A | 7/2011 |

\* cited by examiner

SUPERCONDUCTING COIL SYSTEM AND METHODS OF ASSEMBLING THE SAME

STATEMENT REGARDING FEDERALLY SPONSORED RESEARCH & DEVELOPMENT

This disclosure was made with Government support under contract number DE-EE0005143 awarded by the Department of Energy (DOE). The Government has certain rights in the disclosure.

BACKGROUND

The embodiments described herein relate generally to superconducting coil systems, and more particularly, to methods and systems for protecting superconducting coil systems from damage due to quenching.

Some electrical machines, such as generators or motors, can have a rotating rotor and a stationary stator. The current density and thus the specific power of these machines can be increased, and the efficiency of the machine can also be increased by the use of cryocoolers, wherein superconducting coils of electrical cryocoolers have to be kept at a required low temperature by a coolant. The use of superconducting coils in some electrical machines can result in an increase in electromagnetic forces generated by the coils and an increase in flux densities within the machines.

Superconducting coils typically have near zero electrical resistance. However, superconducting coils may undergo a transition from a superconducting state to a normal, conductive state due to an abrupt change in the magnetic field or a temperature anomaly. This transition of the superconductive state is known as quenching. More particularly, quenching is an abnormal termination of magnet operation that can occur when a superconducting coil enters a normal (resistive) state. Sometimes quench can occur when the magnetic field within the magnet is too large and/or the rate of change of the magnetic field is too large which can result in eddy currents and increased heating to raise the temperature of the coils and surrounding regions. The increased temperature of one coil may increase the temperature of adjacent coils leading to a chain heating reaction. An explosion may occur as the energy in the magnetic field is converted to heat and a rapid boil-off of any cryogenic coolant occurs. Sometimes, when a large magnet undergoes a quench, an inert vapor can be formed by the evaporating cryogenic fluid which can present an asphyxiation hazard to operators by displacing breathable air. Moreover, an abrupt decrease of current can result in inductive voltage spikes and arcing which can damage cryocooler components by localized heating, high voltages and/or large mechanical forces.

BRIEF DESCRIPTION

In one aspect, a superconducting magnet apparatus is provided. The superconducting magnet apparatus includes a power source configured to generate a current; a first switch coupled in parallel to the power source; a second switch coupled in series to the power source; a coil coupled in parallel to the first switch and the second switch; and a passive quench protection device coupled to the coil and configured to by-pass the current around the coil and to decouple the coil from the power source when the coil experiences a quench.

In another aspect, a wind turbine is provided. The wind turbine includes a tower and a nacelle coupled to the tower, and a superconducting magnet apparatus coupled to the nacelle. The superconducting magnet apparatus includes a power source configured to generate a current; a first switch coupled in parallel to the power source; a second switch coupled in series to the power source; a coil coupled in parallel to the first switch and the second switch; and a passive quench protection device coupled in parallel to the coil and configured to by-pass the current around the coil and to disconnect the coil from the power source when the coil experiences a quench.

In another aspect, a method of assembling a superconducting magnet apparatus is provided. Method further includes coupling a first switch in parallel to the power source. Method includes coupling a second switch in series to a power source. Moreover, method includes coupling a coil in parallel to the first switch and the second switch. A passive quench protection device is coupled to the coil.

DRAWINGS

DETAILED DESCRIPTION

The embodiments described herein relate to electrical machines and methods of assembling the electrical machines. More particularly, the embodiments relate to a protection system that is configured to protect superconducting coils from damage due to quenching. It should be understood that the embodiments described herein for electrical machines are not limited to generators, and should be further understood that the descriptions and figures that utilize a generator and a wind turbine are exemplary only.

Figure 1:
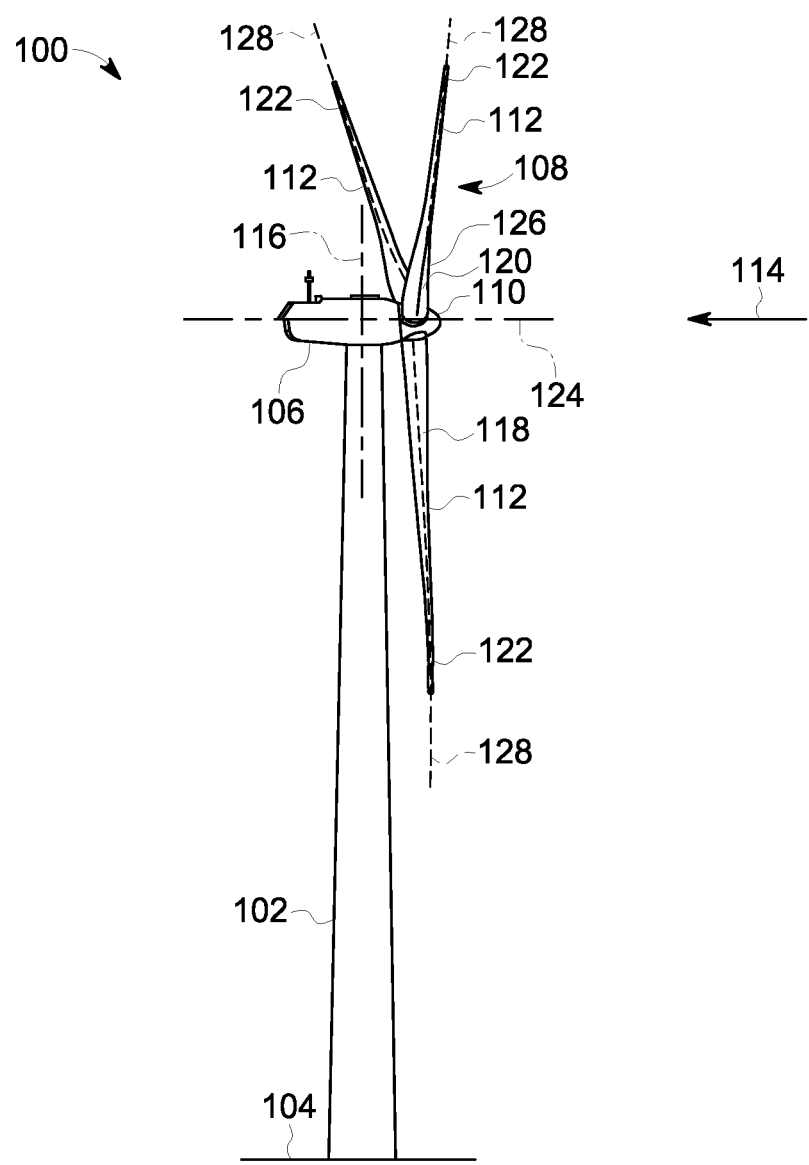
FIG. 1 is perspective view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating rotor 108, thereby transferring kinetic energy from wind 114 into usable mechanical energy, and subsequently, electrical energy. Rotor 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region and a rotor blade load transfer region (not shown). Loads induced to rotor blades 112 are transferred to hub 110 via load transfer regions 120. Each rotor blade 112 also includes a rotor blade tip portion 122.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, lift forces are induced to rotor blade 112 and rotation of rotor 108 about an axis of rotation 124 is induced as rotor blade tip portion 122 is accelerated.

A pitch angle (not shown) of rotor blades 112, i.e., an angle that determines the perspective of rotor blade 112 with respect to the direction of wind 114, may be changed by a pitch assembly (not shown). More specifically, increasing a pitch angle of rotor blade 112 decreases an amount of rotor blade surface area 126 exposed to wind 114 and, conversely, decreasing a pitch angle of rotor blade 112 increases an amount of rotor blade surface area 126 exposed to wind 114. The pitch angles of rotor blades 112 are adjusted about a pitch axis 128 at each rotor blade 112. In the exemplary embodiment, the pitch angles of rotor blades 112 are controlled individually.

Figure 2:
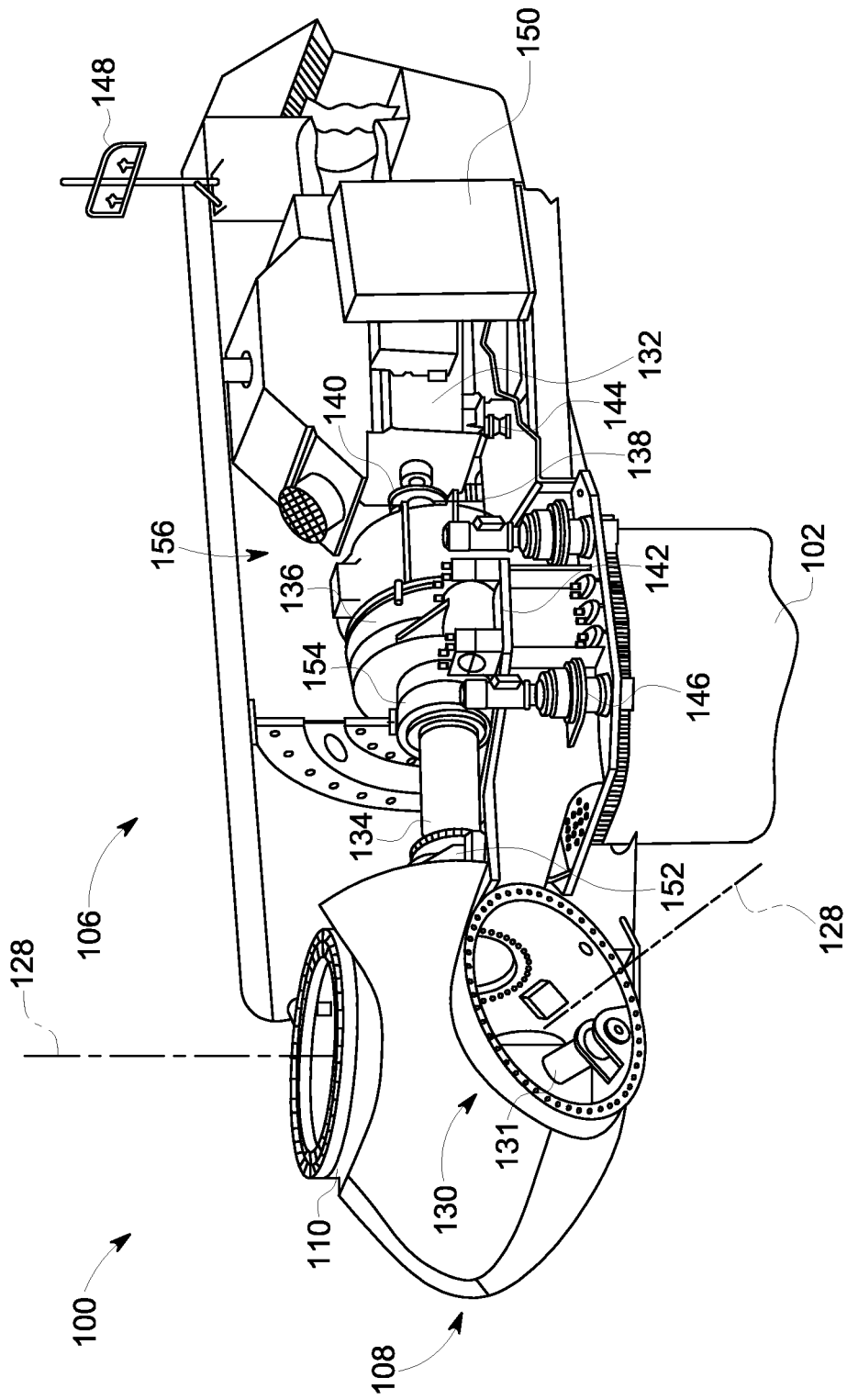
FIG. 2 is a cut-away view of a superconducting generator housed in a nacelle and coupled to a hub of the wind turbine shown in FIG. 1.

FIG. 2 is a partial sectional view of nacelle 106 used with wind turbine 100. In the exemplary embodiment, various components of wind turbine 100 are housed in nacelle 106. For example, in the exemplary embodiment, nacelle 106 includes pitch assemblies 130. Each pitch assembly 130 is coupled to an associated rotor blade 112 (shown in FIG. 1), and modulates a pitch of an associated rotor blade 112 about pitch axis 128. In the exemplary embodiment, each pitch assembly 130 includes at least one pitch drive motor 131.

Moreover, in the exemplary embodiment, rotor 108 is rotatably coupled to an electrical machine 132, for example a superconducting generator, positioned within nacelle 106 via a rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives superconducting generator 132 via coupling 140 and rotation of high speed shaft 138 facilitates production of electrical power by superconducting generator 132. Gearbox 136 is supported by a support 142 and superconducting generator 132 is supported by a support 144. In the exemplary embodiment, gearbox 136 uses a dual path geometry to drive high speed shaft 138.

Alternatively, rotor shaft 134 may be coupled directly to superconducting generator 132 via coupling 140.

Nacelle 106 also includes a yaw drive mechanism 146 that rotates nacelle 106 and rotor 108 about yaw axis 116 to control the perspective of rotor blades 112 with respect to the direction of wind 114. Nacelle 106 also includes at least one meteorological mast 148 that in one embodiment includes a wind vane and anemometer (not shown). In one embodiment, meteorological mast 148 provides information, including wind direction and/or wind speed, to a turbine control system 150. Turbine control system 150 includes one or more controllers or other processors configured to execute control algorithms. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Moreover, turbine control system 150 may execute a SCADA (Supervisory, Control and Data Acquisition) program.

Pitch assembly 130 is operatively coupled to turbine control system 150. In the exemplary embodiment, nacelle 106 also includes forward support bearing 152 and aft support bearing 154. Forward support bearing 152 and aft support bearing 154 facilitate radial support and alignment of rotor shaft 134. Forward support bearing 152 is coupled to rotor shaft 134 near hub 110. Aft support bearing 154 is positioned on rotor shaft 134 near gearbox 136 and/or superconducting generator 132. Nacelle 106 may include any number of support bearings that enable wind turbine 100 to function as disclosed herein. Rotor shaft 134, superconducting generator 132, gearbox 136, high speed shaft 138, coupling 140, and any associated fastening, support, and/or securing device including, but not limited to, support 142, support 144, forward support bearing 152, and aft support bearing 154, are sometimes referred to as a drive train 156.

Figure 3:
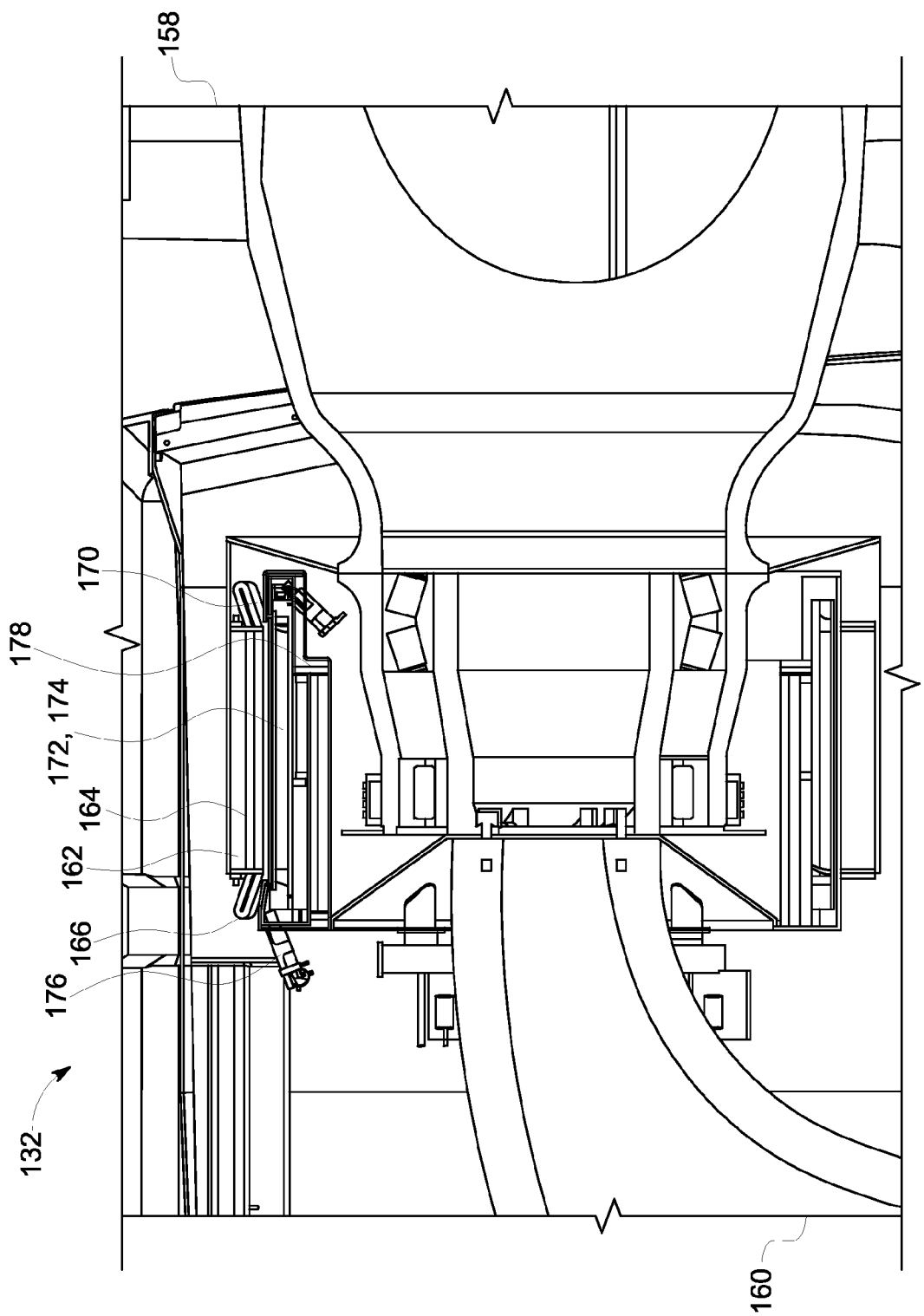
FIG. 3 is a cross sectional view of the exemplary superconducting generator shown in FIG. 2.

FIG. 3 is a cross sectional view of superconducting generator. Nacelle includes a hub end 158 coupled to hub and a non-hub end 160 coupled to tower 102. A stator 162 includes conductive coils 162 arranged longitudinally along the length of stator 162 and on an inside cylindrical surface of stator 162. In the exemplary embodiment, conductive coils 164 are coupled at their opposite ends to one another by conductive end turns 166. Coils 164 are separated from rotating stator 162 by an air gap 168. A rotor 170 includes a coil former 172 and coil 174. Superconducting generator 132 includes a cooling assembly 176 coupled to rotor 170 and a torque assembly 178 coupled to rotor 170, which is configured to retain and insulate coils 174 so that coils 174 are cooled to near absolute zero (e.g., 4 K).

Figure 4:
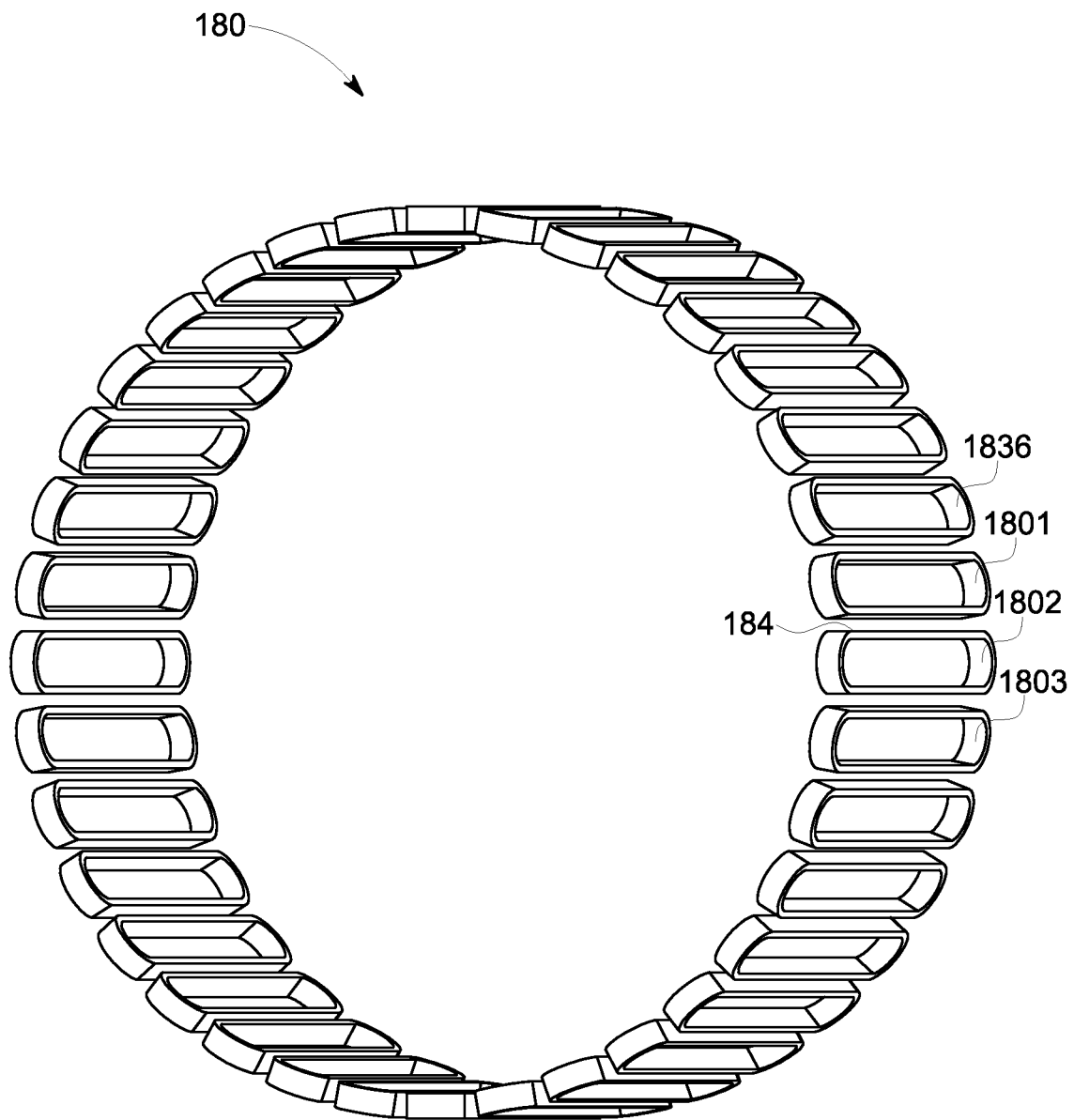
FIG. 4 is a perspective view of a plurality of coils of superconducting generator shown in FIG. 3.

FIG. 4 is a perspective view of a plurality of coils 180 of superconducting generator 132 (shown in FIG. 2) coupled in series. In the exemplary embodiment, the plurality of coils 180 includes thirty six coils (1801, 1802, 1803 ... 1836) coupled in series. Alternatively, the plurality of coils 180 may include more than thirty six coils 180 or less than thirty six coils 180. Moreover, pairs of coils 180 are configured to form a pole 182. Coils 180 include strip-shaped, tape type or round or rectangular or twisted braids of conductors of low temperature and/or high temperature superconducting materials which are coupled radially inward within a winding block 184.

Figure 5:
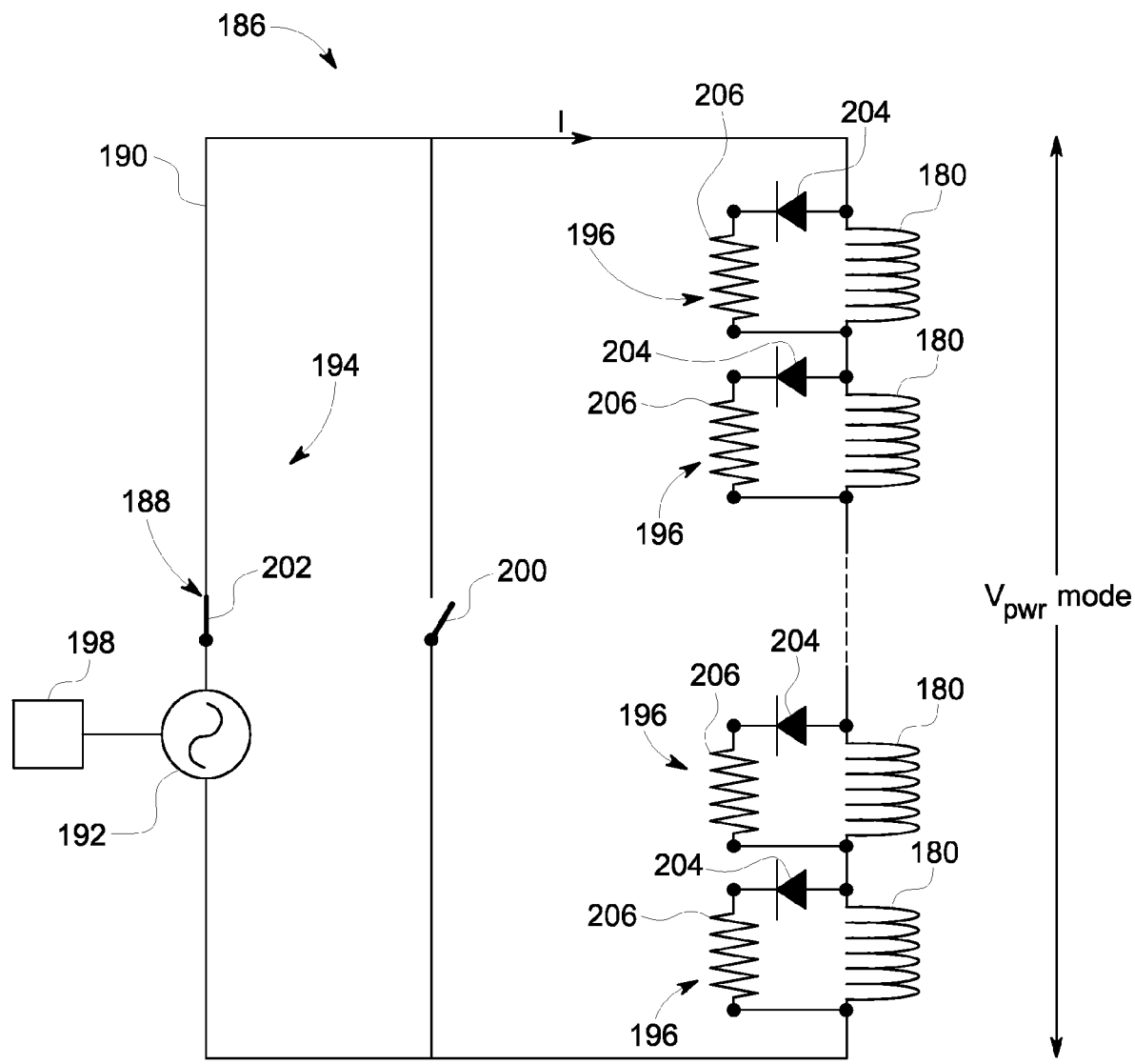
FIG. 5 is a circuit diagram illustrating an exemplary superconducting magnet apparatus of the generator shown in FIG. 3 in a power mode.

FIG. 5 is a circuit diagram of a superconducting magnet apparatus 186 of superconducting generator 132 (shown in FIG. 3) in a power mode 188. Superconducting magnet apparatus 186 includes a circuit 190 having a power source 192, a switch assembly 194, a passive quench protection device 196 and a quench detector 198 coupled to the plurality of coils 180. Passive quench protection device 196 is configured to protect each coil 180 from experiencing a full, stored energy load of superconducting generator 132 during a quench to a normal (resistive) state and to sequentially switch out coils 180 as coils 180 quench to normal state as described herein.

Switch assembly 194 includes a first switch 200 such as, for example, a normally open switch, i.e., first switch 200 is configured as normally and/or primarily set in an open position. Switch assembly further includes a second switch 202 such as, for example, a normally closed switch, i.e., second switch 202 is configured as a normally and/or primarily set in a closed position. Normally closed switch 202 is coupled in series to power source 192 and normally open switch 200 is coupled in parallel to power source 192. Each coil 180 is coupled in parallel to power source 192 and to normally open switch 200 and in parallel to normally closed switch 202. During power mode 188, a resistance of coil 180 is less than a resistance of passive quench protection device 196. More particularly, in power mode 188, resistance of coil 180 is nearly zero. In power mode 188, current I flows from power source 192, through normally closed switch 202 and through each coil 180 since coil resistance is nearly zero.

Normally closed switch 202 is configured to maintain resistance to facilitate current I flow from power source 192 and through coil 180 while superconducting generator 132 is in power mode 188. Moreover, normally closed switch 202 is configured to maintain a closed circuit once coil 180 is energized during an unquenched state. In an embodiment, normally closed switch 202 includes back-to-back diodes and active electro-mechanical devices. Normally closed switch 202 can include any configuration that enables circuit 190 to function as described herein. Normally open switch 200 is configured to allow current I flow from power source 192 through normally closed switch 202 and through coils 180 while coils 180 are in unquenched state. In an embodiment, normally open switch 200 includes shunted back-to-back power diodes, back-to-back Zener diodes coupled in series, and a metal oxide semiconductor field effect transistor (MOSFET). Normally open switch 200 can include any configuration that enables circuit 190 to function as described herein.

In the exemplary embodiment, switches 200, 202 are configured to operate in a non-persistent mode. Alternatively, switches 200, 202 can operate in a persistent mode. Switches 200 202 can operate in any mode to enable superconducting magnet apparatus 186 to function as described herein. Persistent mode includes a short circuiting of coils 180, wherein coils 180 are configured as a closed superconducting loop. In the persistent mode, power source 192 can be turned off and persistent current I is configured to flow for a period of time. Passive quench protection device 196 is coupled to each coil 180 of the plurality of coils 180. More particularly, passive quench protection device 196 is coupled in parallel to coil 180 and configured to facilitate current I flow from power source 192 and through coils 180. Since coil resistance, in power mode 188, is less than resistance of passive quench protection device 196, current I flows through coils 180. In the exemplary embodiment, passive quench protection device 196 includes a diode 204 coupled in parallel to coil 180 and a resistor 206 coupled in series to diode 204.

Figure 6:
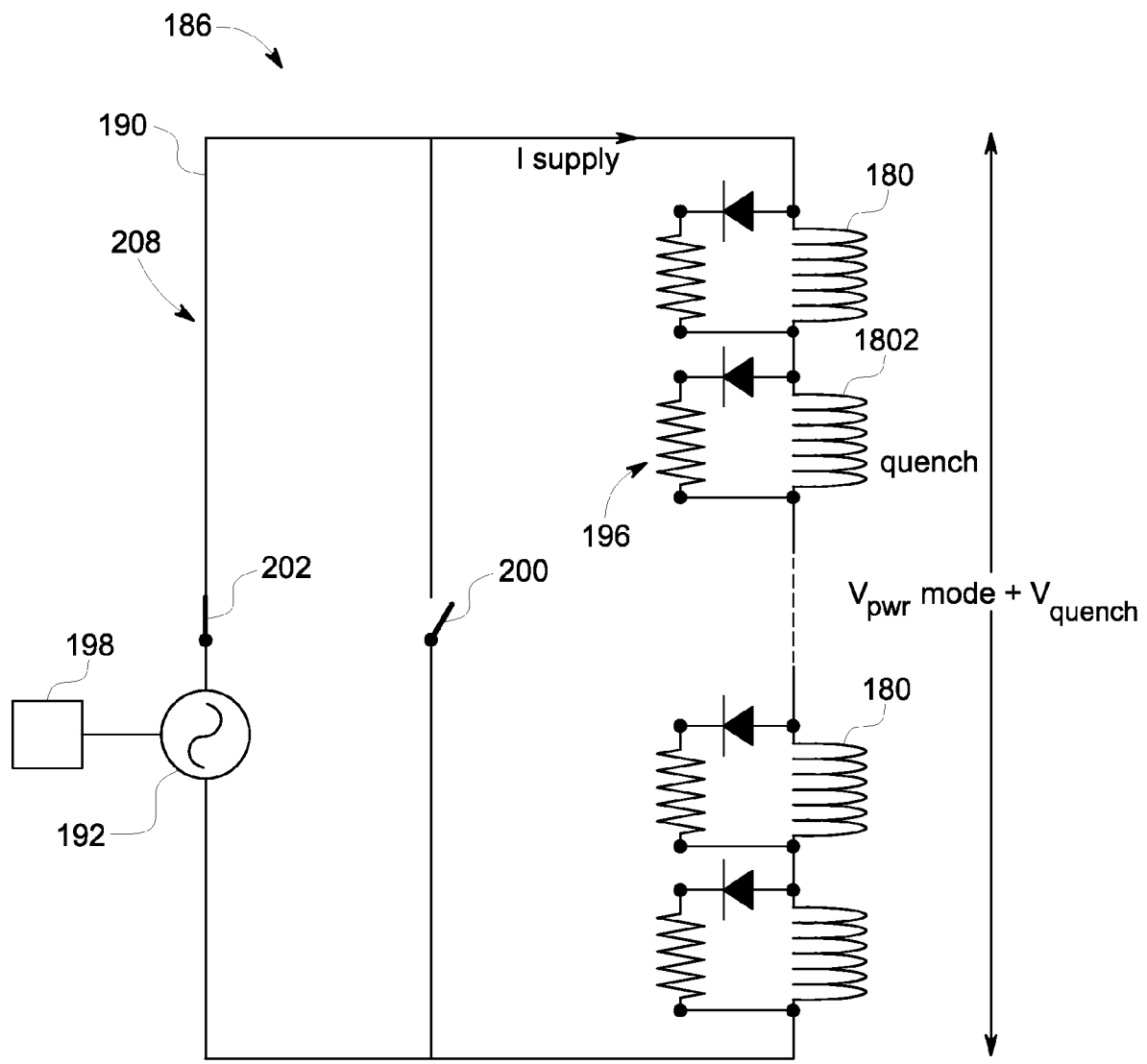
FIG. 6 is a circuit diagram of the superconducting magnet apparatus shown in FIG. 5 in a quench mode.

FIG. 6 is a circuit diagram of superconducting magnet apparatus 186 in a quench mode 208. More particularly, coil 1802 is shown in quench mode 208 which includes coil 1802 experiencing a quench. Quench mode 208 is an abnormal termination of magnet operation that occurs when at least one coil 180 transitions to the normal (resistive) state. When quench mode 208 occurs, coil 1802 resistance increases which subjects coil 180 to rapid heating. The rapid heating facilitates raising the temperature of surrounding coils 180 and/or surrounding regions of superconducting generator. Surrounding coils 180 proceed to normal which facilitates additional heating within superconducting generator in a chain reaction. During quench mode 208, coil 1802 transitions to normal and current resistance increases within coil 1802. More particularly, in quench mode 208, resistance of coil 1802 is larger than resistance of passive quench protection device 196.

Figure 7:
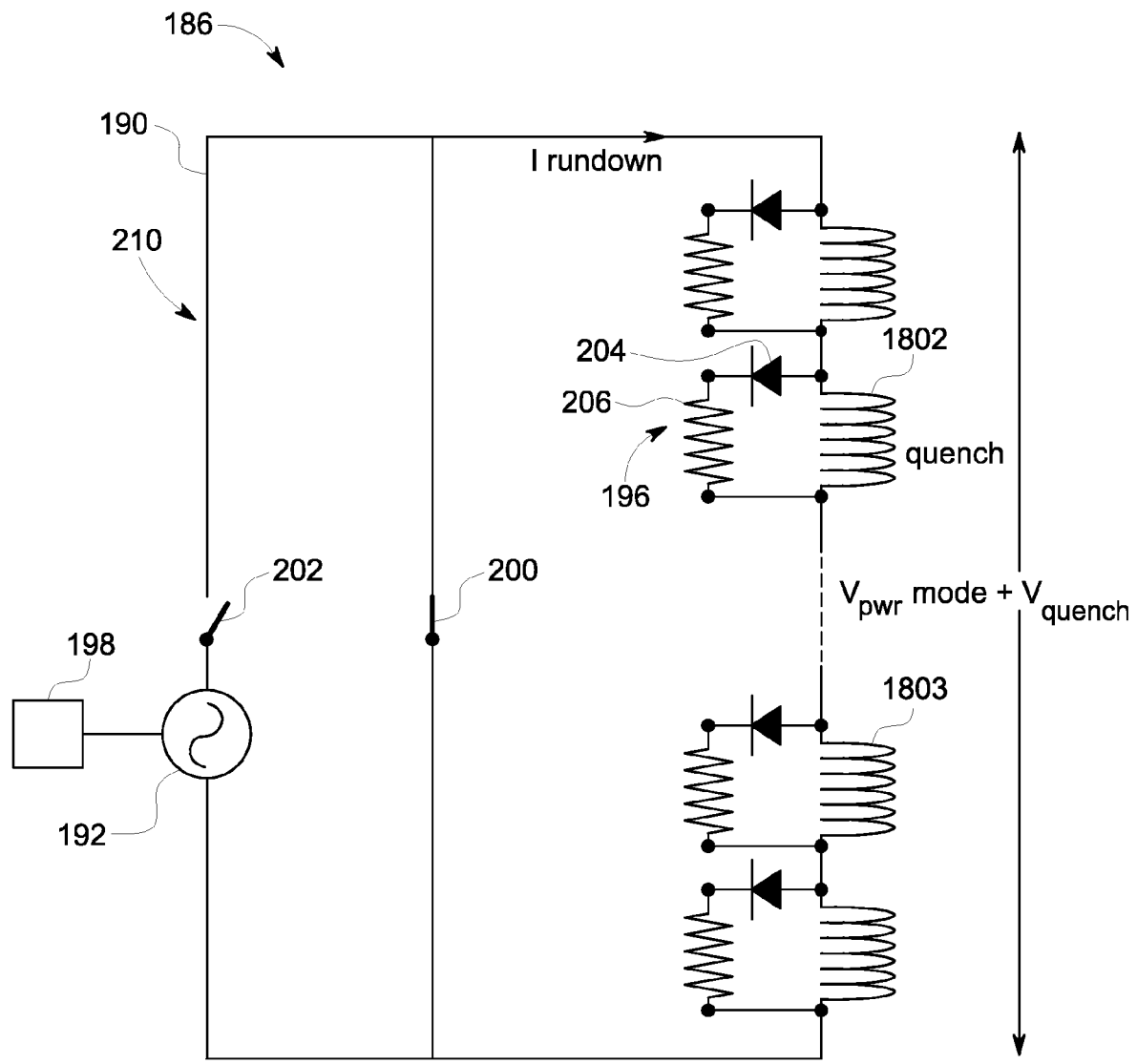
FIG. 7 is a circuit diagram of the superconducting magnet apparatus shown in FIG. 5 in a rundown mode.

FIG. 7 illustrates circuit diagram of superconducting magnet apparatus 186 in a rundown mode 210. In the rundown mode 210, quench detector 198 is configured to monitor coil 1802 and detect quench voltage. Moreover, quench detector 198 is configured to open normally closed switch 202 and close normally open switch 200 to facilitate rundown of circuit 190 through normally open switch 200, now closed.

Passive quench protection device 196 is configured to maintain a lower resistance level than coil resistance in quench mode 208. More particularly, passive quench protection device 196 is configured to by-pass current I around coil 1802 when coil 1802 is in quench mode 208. Moreover, quench detector 198 and/or passive quench protection device 196 is configured to decouple coil 1802 from power source 192 when coil 1802 is in quench mode 208 to facilitate forcing current I into rundown mode 210. More particularly, current I is configured to flow through now closed normally open switch 200. Moreover, due to at least lower resistance of passive quench protection device 196 as compared to resistance of quenching coil 1802, current I is configured to flow through diode 204 and resistor 206, by-pass around quenching coil 1802 and flow to adjacent unquenched coil 1803.

Figure 8:
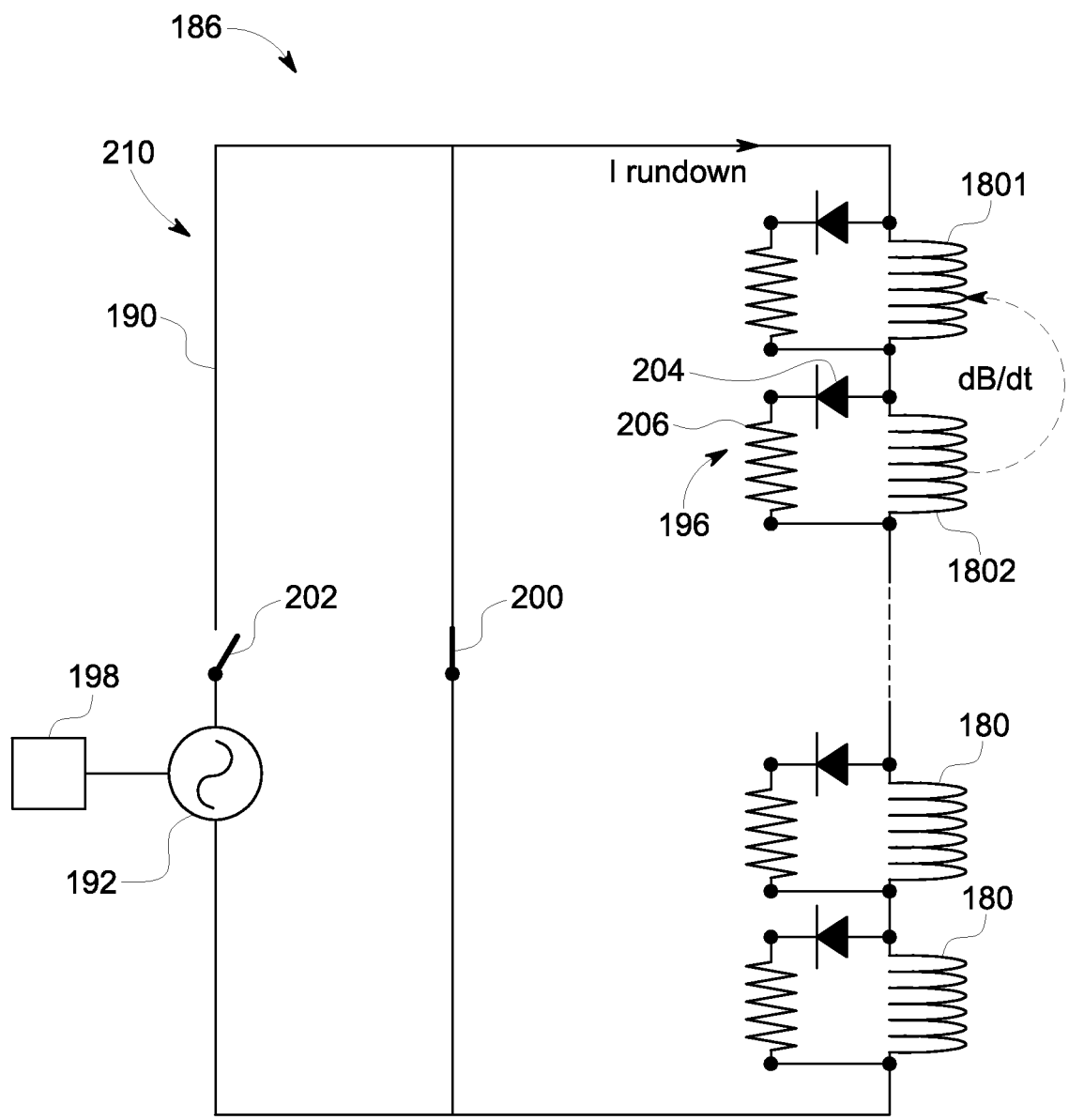
FIG. 8 is a circuit diagram illustrating the superconducting magnet apparatus shown in FIG. 5 in another rundown mode.

FIG. 8 illustrates circuit diagram of superconducting magnet apparatus 186 in rundown mode 210. In rundown mode 210, quench is configured to propagate around superconducting generator 132 by inductively driven rate losses in adjacent and/or surrounding coils 180 of quenched coil 1802. In the exemplary embodiment, losses in adjacent and/or surrounding coils 180 are generated by coupling losses. Each passive quench protection device 196 is configured to by-pass current I around each subsequent quenching coil 180, for example coil 1801 allowing each coil 180 to run down in a local loop. Moreover, passive quench protection device 196 is configured to employ the natural rate losses in adjacent and/or surrounding coils 180 to force adjacent and/or surrounding coils 180 of quenching coil 1802 to normal. In the exemplary embodiment, circuit rundown is facilitated by employing a dB/dt of quenching coils 180. Passive quench protection device 196 is configured to allow coils 180 to sequentially quench as each quenching coil 180 proceeds to normal by by-passing current I through diode 204 and resistor 206 of each passive quench protection device 196. For example, after coil 1802 quenches, quench is proprogated to coil 1801. Passive quench protection device 196 that is coupled to coil 1801 is configured to direct current I through diode 204 and resistor 206 to by-pass current I around now quenching coil 1801.

During quenching, when coil 1802 proceeds to normal, current I is routed around quenching coil 1802. Stored energy of superconducting generator 132 is minimized and/or eliminated from passing through quenching coil 1802. Moreover, since quench protection device 196 is passive, rundown mode 210 activates quickly because there is minimal or no active component to intervene after detecting quench. Further, resistance value of resistor 206 of passive quench protection device 196 is predetermined to facilitate controlling response time of sequentially switched out coils 180 through diode 204 and resistor 206. Moreover, the time constant is decreased as coils 180 controllably and sequentially quench through rundown mode 210. Once coils 180 have quenched, superconducting generator 132 is configured to naturally re-cool allowing the system to become operational again such that normally closed switch 202 is re-closed and normally open switch 200 is re-opened to facilitate powering up superconducting generator 132 to operating current I of power mode 188. In the exemplary embodiment, superconducting generator 132 is configured to remain operational at a lower capacity if coil 180 does not recover from quench.

Figure 9:
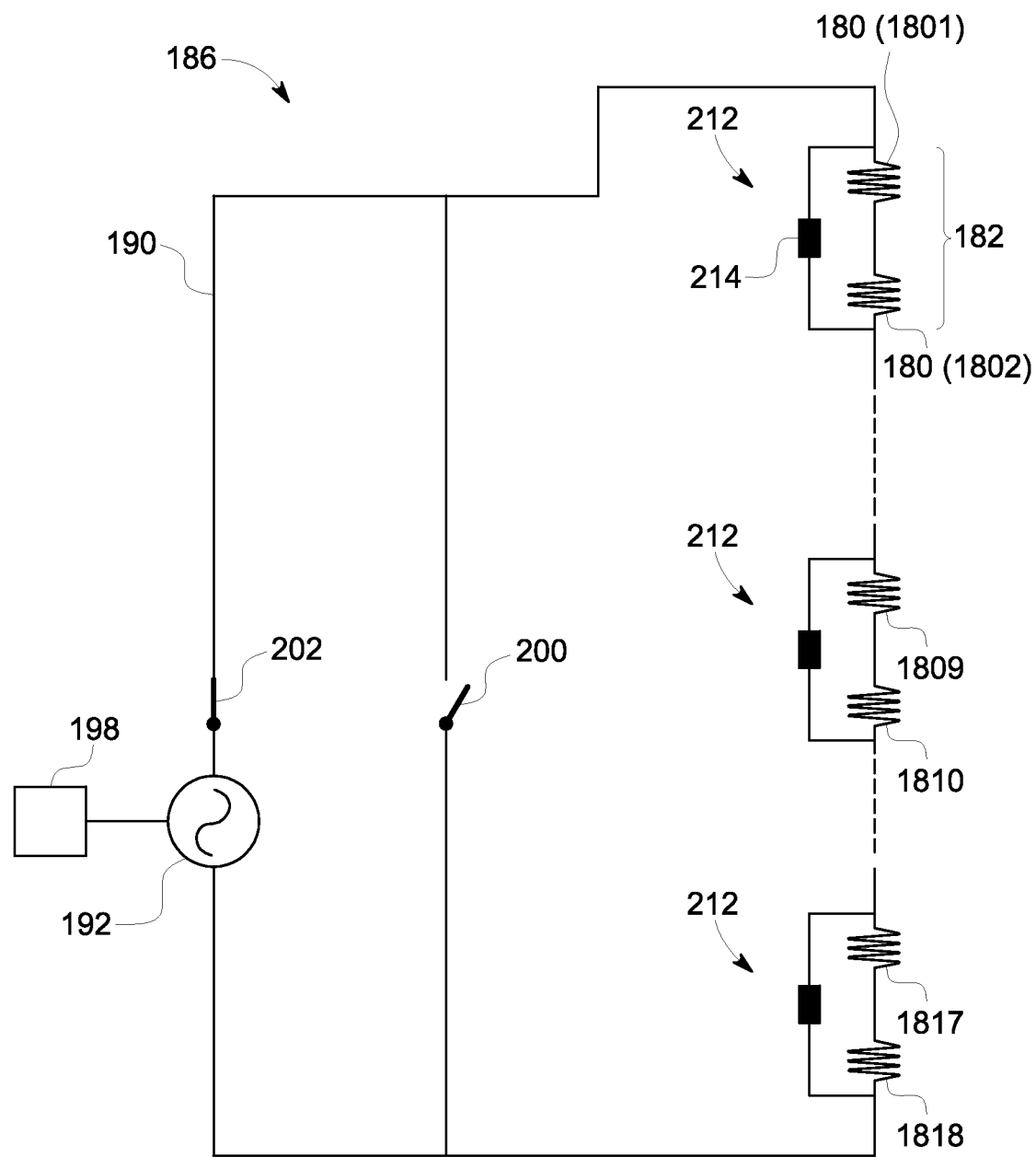
FIG. 9 is a circuit diagram illustrating another exemplary superconducting magnet apparatus of the superconducting generator shown in FIG. 2.

FIG. 9 is a circuit diagram illustrating another passive quench protection device 212 for superconducting generator 132 (shown in FIG. 2). In the exemplary embodiment, passive quench protection device 212 is coupled to pole 182 of a pair of coils 180, for example coils, 1801, 1802; 1809, 1810; and 1817 and 1818. Moreover, passive quench protection device 196 includes a shunt resistor 214 coupled in parallel to pairs of coils 180. Alternatively, passive quench protection device 212 can include any type of resistor to enable superconducting generator 132 to function as described herein. In power mode 188, resistance values of coils 180 are less than resistance value of shunt resistor 214. In quench mode 208, resistances of coils 180 are larger than resistance of passive quench protection device 212.

Passive quench protection device 212 is configured to maintain a lower resistance level than coil resistance in quench mode 208. More particularly, passive quench protection device 212 is configured to by-pass current I around coil 1802 when coil 1802 is in quench mode 208. Moreover, quench detector 198 and/or passive quench protection device 212 is configured to decouple coil 1802 from power source 192 when coil 1802 is in quench mode 208 to facilitate forcing current I into rundown mode 210. Current I is configured to flow through now closed normally open switch 200. Moreover, due to at least lower resistance of shunt resistor 214 of passive quench protection device 196 as compared to resistance of quenching coil 180, current I is configured to flow through shunt resistor 214, by-pass around quenching coil 1802 and flow to adjacent unquenched coil 180.

Each passive quench protection device 212 is configured to dissipate stored energy of the magnetic field in pole 182 and to by-pass current I around each respective quenching coil 180 allowing each coil 180 to run down in a local loop. Moreover, passive quench protection device 212 is configured to sequentially quench as each quenching coil 180 proceeds to normal by by-passing current I around quenching coil 180 and through shunt resistor 214. The resistance value of shunt resistor 214 is predetermined to facilitate controlling response time of sequentially switching out coils 180 through shunt resistor 214.

Figure 10:
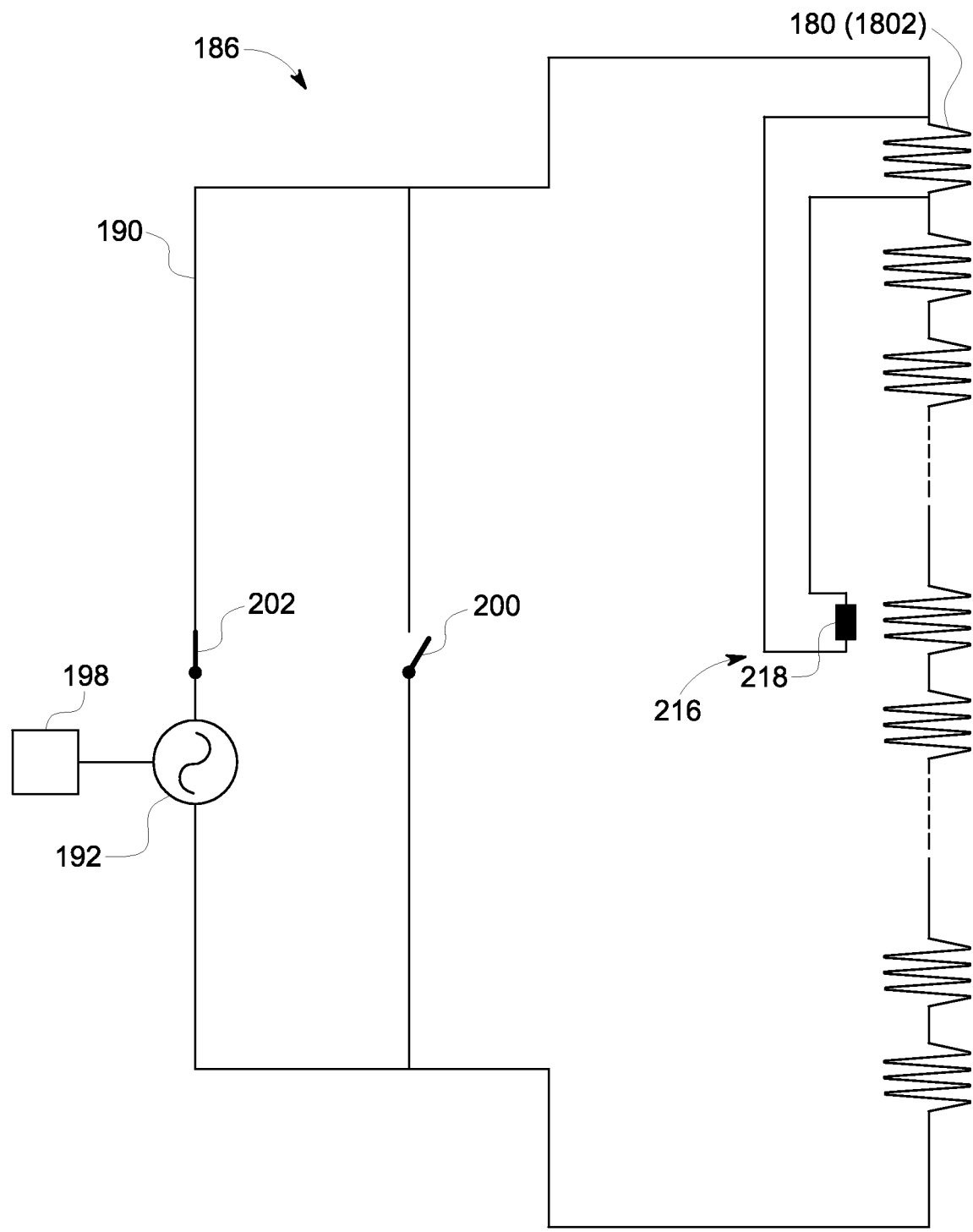
FIG. 10 is a circuit diagram illustrating another exemplary superconducting magnet apparatus of the superconducting generator shown in FIG. 2.

FIG. 10 is a circuit diagram illustrating another passive quench protection device 216 for superconducting generator 132 (shown in FIG. 2). Quenching can create force imbalance within the superconducting generator 132 by a resulting asymmetric magnetic field, which affects rotating parts (not shown) of superconducting generator 132 by creating large torques and/or off-axis bearing loads. In the exemplary embodiment, passive quench protection device 216 is coupled to coil 180. Moreover, passive quench protection device 216 includes a heater 218 coupled in parallel to coil 180. In power mode 188, resistance value of coil 180 is less than resistance value of heater 218. In quench mode 208, resistance of coil 180 is larger than resistance of heater 218.

Passive quench protection device 216 is configured to maintain a lower resistance level than coil 180 resistance in quench mode 208. More particularly, passive quench protection device 216 is configured to by-pass current I around coil 1802 when coil 1802 is in quench mode 208 allowing each coil 180 to run down in a local loop. Moreover, quench detector 198 and/or passive quench protection device 216 is configured to decouple coil 1802 from power source 192 when coil 1802 is in quench mode 208 to facilitate forcing current I into rundown mode 210. Current I is configured to flow through now closed normally open switch 200. Moreover, due to at least lower resistance of heater 218 of passive quench protection device 216 as compared to resistance of quenching coil 1802, current I is configured to flow through heater 218, by-pass around quenching coil 1802 and flow to adjacent unquenched coil 180.

Each passive quench protection device 216 is configured to maintain magnetic field symmetry by by-passing current I around each respective quenching coil 180. Heater 218 is configured to be powered by voltage developed across quenching pair to quench pole 182. Moreover, passive quench protection device 216 is configured to allow coils to sequentially quench as each quenching coil 180 proceeds to normal by by-passing current I around quenching coil 180 and through heater 218. The resistance value of heater 218 is predetermined to facilitate controlling response time of sequentially switching out coils 180 through heater 218.

Figure 11:
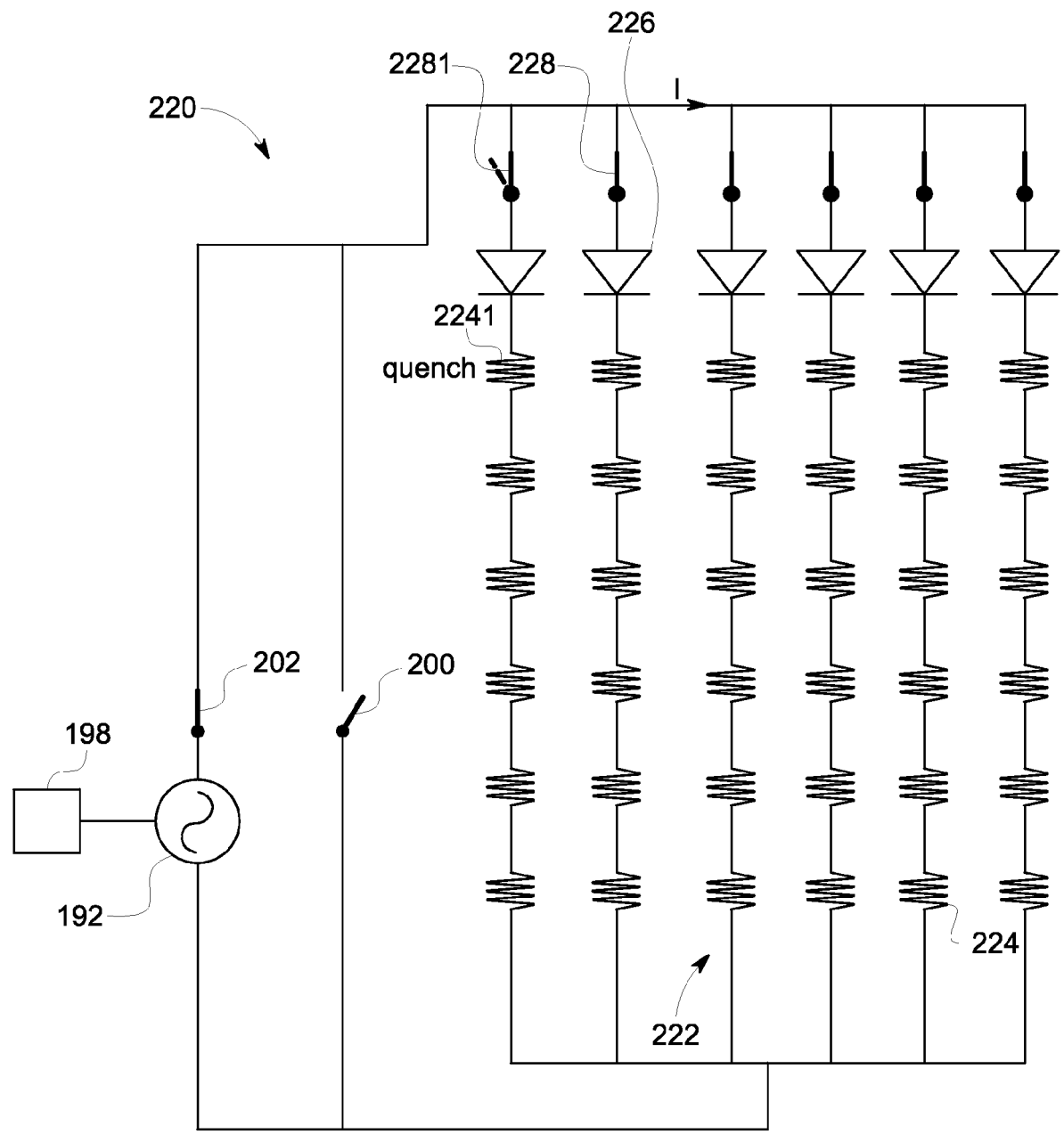
FIG. 11 is a circuit diagram illustrating another exemplary superconducting magnet apparatus of the superconducting generator shown in FIG. 2.

FIG. 11 is a circuit diagram illustrating another passive quench protection device 220 for superconducting generator 132 (shown in FIG. 2). Superconducting generator 132 includes a plurality of coil arrangements 222 is coupled in parallel to power source 192. Moreover, each coil arrangement 222 includes a plurality of coils 224 coupled in series. In the exemplary embodiment, passive quench protection device 220 includes a plurality of diodes 226 coupled in series to respective coil arrangements 222. Further, passive quench protection device 220 includes a plurality of switches 228 coupled to the plurality of diodes 226.

Switches 228 are configured to selectively open and close to couple and decouple the plurality of coils 224 from power source 192. More particularly, in quench mode 208, quenching coil 2241 is isolated by opening respective switch 2281 to by-pass current I around quenching coil 2241 and selectively direct current I through other coil arrangements 222. In the exemplary embodiment, the plurality of coil arrangements 222, diodes 226 and switches 228 are configured to minimize and/or eliminate stored energy of superconducting generator 132 that can be dissipated in each coil arrangement 222. More particularly, switches 228 are configured to selectively open and close to minimize and/or eliminate force imbalance within coil arrangements 222 to facilitate minimizing and/or eliminating damage to superconducting generator 132.

Figure 12:
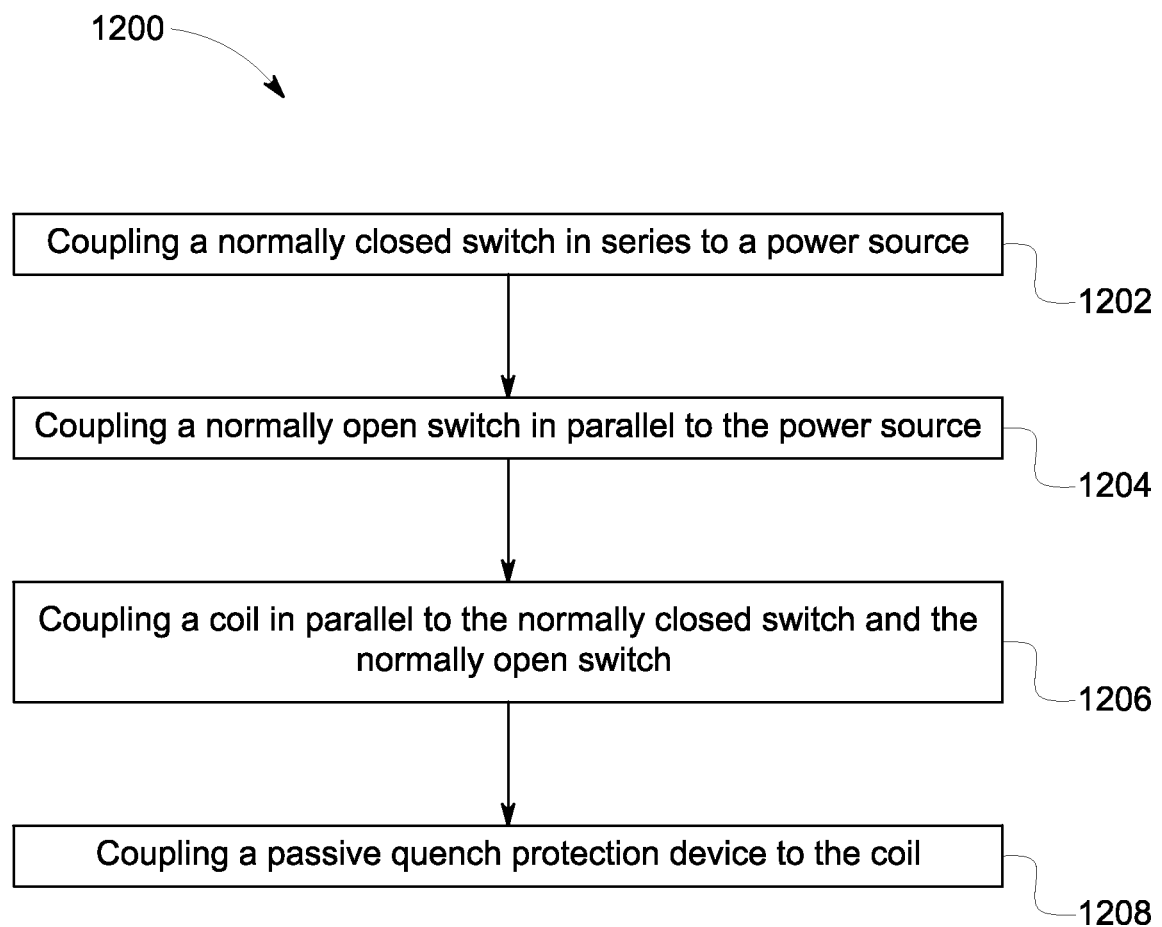
FIG. 12 illustrates an exemplary flowchart illustrating a method of assembling a superconducting magnet apparatus for an electrical machine.

FIG. 12 illustrates a flowchart illustrating a method 1200 of assembling a superconducting magnet apparatus, such as apparatus 186 (shown in FIG. 5), for an electrical machine, for example machine 132 (shown in FIG. 2). Method 1200 includes coupling 1202 a normally closed switch, such as normally closed switch 202 (shown in FIG. 5), in series to a power source, for example power source 192 (shown in FIG. 5). Moreover, method 1200 includes coupling 1204 a normally open switch, such as normally open switch 200 (shown in FIG. 5), in parallel to the power source. A coil, for example coil 180 (shown in FIG. 5), is coupled 1206 in parallel to the normally closed switch and normally open switch.

Method 1200 includes coupling 1208 a passive quench device, such as passive quench device 196 (shown in FIG. 5), to the coil. In one embodiment, coupling 1208 the passive quench device to the coil includes coupling a diode, for example diode 204 (shown in FIG. 5), and a resistor, for example resistor 206 (shown in FIG. 5), in parallel to the coil. In another embodiment, coupling 1208 the passive quench device to the coil includes coupling a resistor, for example resistor 214 (shown in FIG. 9), in parallel to the coil. Moreover, in another embodiment, coupling 1208 the passive quench device to the coil includes coupling heater, for example heater 218 (shown in FIG. 10), to the coil. Still further, in another embodiment, coupling 1208 the passive quench device to the coil includes coupling a coil arrangement, for example coil arrangement 222 (shown in FIG. 11), to a plurality of diodes, such as diodes 226 (shown in FIG. 11), and to a plurality of switches, for example switches 228 (shown in FIG. 11).

In the exemplary embodiment, a controller (not shown) is configured to communicatively couple to superconducting magnet apparatus to control quenching of electrical machine. Due to remote locations of many wind turbines and difficult access to the generator located within nacelle, controller is configured to control superconducting magnet apparatus during the quenching process. In the exemplary embodiment, a remote operator (not shown) sends a signal (not shown) by any known means to controller to activate superconducting magnet apparatus to selectively control quenching of the electrical machine.

The embodiments described herein relate to a quench protection device for uniform control of quenching of generators such as superconducting generators in electrical machines. The quench protection device is configured to by-pass the current around a quenching coil and to decouple the quenching coil from the power source when the coil experiences a quench mode. The quench protection device is configured to protect components of the electrical machine when: stored energy in quenching coil or the whole array of the coils is dissipated in a small resistive region in the quenching coil; high temperature exists in the quenching coil and/or in other coils; a large imbalance exists in transient forces. More particularly, the quench protection device is configured to prevent, minimize and/or eliminate damage to the coils and rotor imbalance and minimize cryogenic recovery time, minimize system down time and damage, allows the system to run at reduced capacity with a damaged coil and maintains field symmetry. Moreover, the embodiments described herein increase current capacity of the electrical machine while reducing the size of the electrical machine for a given power rating. The smaller electrical machine requires less material and less space.

A technical effect of the systems and methods described herein includes at least one of: a superconducting magnet apparatus having a power source configured to generate a current; a normally closed switch coupled in series to the power source; a normally open switch coupled in parallel to the power source; a coil coupled in parallel to the normally closed switch and the normally open switch; and a passive quench protection device coupled to the coil and configured to by-pass the current around the coil and to decouple the coil from the power source when the coil experiences a quench mode.

Exemplary embodiments of an electrical machine and methods for assembling the electrical machine are described above in detail. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other electrical component applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A superconducting magnet apparatus comprising:
a power source configured to generate a current;
a first switch coupled in parallel to said power source;
a second switch coupled in series to said power source;
a coil coupled in parallel to said first switch and said second switch; and
a passive quench protection device coupled to said coil and configured to by-pass the current around said coil and to decouple said coil from said power source when said coil experiences a quench;
wherein said coil comprises a plurality of coils coupled in series; and
further comprising:
a plurality of diodes coupled in series to the respective plurality of coils; and
a plurality of switches coupled to said plurality of diodes, wherein said switches are configured to selectively open and close to couple and decouple said plurality of coils to said power source.

2. The superconducting magnet apparatus of claim 1, wherein said passive quench protection device is coupled in parallel to said coil and comprises a diode coupled in parallel to said coil.

3. The superconducting magnet apparatus of claim 1, wherein said passive quench protection device comprises a diode and a resistor coupled in parallel to said coil.

4. The superconducting magnet apparatus of claim 1, wherein said first switch comprises back-to-back diodes.

5. The superconducting magnet apparatus of claim 1, wherein said first switch comprises a non-persistent switch.

6. The superconducting magnet apparatus of claim 1, wherein said coil comprises a first coil and a second coil and said passive quench protection device comprises a resistor coupled in parallel to said first and second coils.

7. The superconducting magnet apparatus of claim 1, wherein said passive quench protection device comprises a heater coupled in parallel to said coil.

8. The superconducting magnet apparatus of claim 1, wherein said passive quench protection device is configured to open said second switch and close said first switch when said coil experiences the quench.

9. The superconducting magnet apparatus of claim 1, wherein said first switch comprises a normally open switch and said second switch comprises a normally closed switch.

10. A wind turbine, comprising:
a tower;
a nacelle coupled to said tower; and
a superconducting magnet apparatus coupled to said nacelle and comprising:
a power source configured to generate a current;
a first switch coupled in parallel to said power source;
a second switch coupled in series to said power source;
a coil coupled in parallel to said first switch and said second switch; and
a passive quench protection device coupled in parallel to said coil and configured to by-pass the current around said coil and to disconnect said coil from said power source when said coil experiences a quench;
wherein said coil comprises a plurality of coils coupled in series; and
further comprising:
a plurality of diodes coupled in series to the respective plurality of coils; and
a plurality of switches coupled to said plurality of diodes, wherein said switches are configured to selectively open and close to couple and decouple said plurality of coils to said power source.

11. The wind turbine of claim 10, wherein said passive quench protection device comprises at least one of a diode and a resistor coupled in parallel to said coil; a resistor coupled in parallel to said coil; and a heater coupled in parallel to said coil.

12. The wind turbine of claim 10, wherein said coil comprises a smaller resistance than a resistance of said passive quench protection device.

13. The wind turbine of claim 10, wherein said coil in quench comprises a larger resistance than a resistance of said passive quench protection device.

14. The wind turbine of claim 10, wherein said passive quench protection device is configured to open second switch and sequentially switch out adjacent coils of said coil in quench.

15. A method of assembling a superconducting magnet apparatus, said method comprising:
coupling a first switch in parallel to the power source;
coupling a second switch in series to a power source;
coupling a coil in parallel to the first switch and the second switch; and
coupling a passive quench protection device to the coil;
wherein said coil comprises a plurality of coils coupled in series; and
further comprising:
a plurality of diodes coupled in series to the respective plurality of coils; and
a plurality of switches coupled to said plurality of diodes, said switches are configured to selectively open and close to couple and decouple said plurality of coils to said power source.

16. The method of claim 15, wherein coupling the passive quench protection device comprises coupling a diode and resistor in parallel to the coil.

17. The method of claim 15, wherein coupling the passive quench protection device comprises coupling a shunt resistor in parallel to the coil.

18. The method of claim 15, wherein coupling the passive quench protection device comprises coupling a heater to the coil.

19. The apparatus of claim 1, wherein the passive quench device is configured to employ the natural rate losses in adjacent and/or surrounding coils, so as to force the adjacent and/or surrounding coils of the coil experiencing a quench, to a normal state.

* * * * *